United States Patent Office

3,488,418
Patented Jan. 6, 1970

3,488,418
SUSTAINED RELIEF ANALGESIC COMPOSITION
William M. Holliday, Madison, Murray Berdick, Branford, Saul A. Bell, New Haven, and George C. Kiritsis, North Branford, Conn., assignors, by mesne assignments, to Sterling Drug Inc., New York, N.Y., a corporation of Delaware
Filed Nov. 18, 1965, Ser. No. 508,528
Int. Cl. A61k 9/04, 27/00
U.S. Cl. 424—35                    2 Claims

ABSTRACT OF THE DISCLOSURE

This invention relates to novel pharmaceutical compositions and techniques for providing sustained analgesic relief employing acetylsalicylic acid (aspirin) as the active therapeutic agent. The novel composition of the present invention is an analgesic preparation comprising ethyl cellulose encapsulated particles of acetylsalicylic acid wherein the relative thickness of the ethyl cellulose layer to the acetylsalicylic acid layer is such that substantailly all of the encapsulated acetylsalicylic acid will be gradually released into the blood by a diffusion mechanism over a period of four hours upon oral administration which surprisingly affords eight hours of analgesic relief.

---

Figure 1:
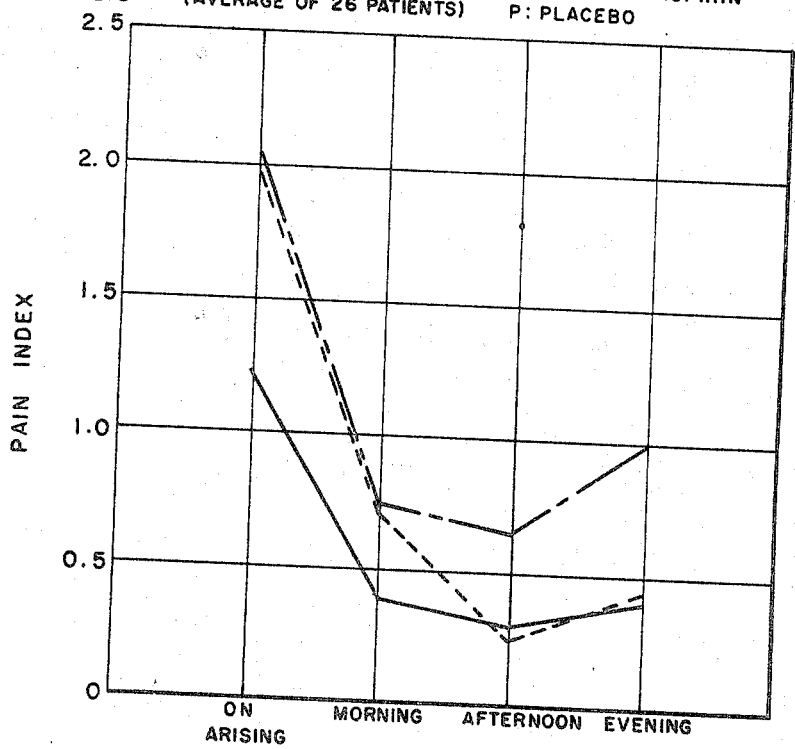

Prior to the present invention there have been prepared various types of timed release pharmaceutical preparations containing aspirin as the active ingredient. Most, if not all, of the heretofore used timed release aspirin preparations have not been truly effective for providing sustained analgesic relief over a relatively long period of time.

The failure of many of the heretofore known timed release aspirin preparations can be attributed to a failure of prior investigations to appreciate fully the chemical and physiological factors involved when aspirin is taken into the body as a therapeutic agent, particularly with respect to its analgesic and anti-inflammatory activities.

It is a recognized fact that with aspirin the maximum time of effectiveness as an analgesic is only a few hours due to the biochemical decomposition of aspirin in the body. Accordingly, when used as an analgesic the patient must take repeated dosages every few hours. Also, the extent of relief will fluctuate between dosages since the analgesic level will constantly decrease due to the aforementioned biochemical decomposition of the analgesic in the body.

Heretofore, many attempts have been made to overcome the aforementioned drawbacks of conventional aspirin tablets by providing aspirin in the form of timed release pharmaceutical preparations whereby aspirin is released into the blood stream over a relatively long period of time, generally over an 8 hour period. Most of these prior preparations failed to give truly effective analgesic relief over the desired period for the reason there was not maintained in the body over the desired period an effective degree of analgesia. In short, when such preparations are employed, the active analgesic component (aspirin) decomposes to an inactive state at a faster rate than it is introduced into the blood system so that the overall level of active component is too low to exert effective analgesic relief over the desired period.

Other preparations have used a combination of free aspirin and sustained release aspirin to provide both immediate and prolonged results. In such systems, solid aspirin particles are in contact with the sensitive gastric mucosa. Many investigators consider such contact to be a cause of gastric irritation and gastric bleeding.

Objects and advantages of the invention will be set forth in part hereinafter and in part will be obvious herefrom, or may be learned by practice with the invention, the same being realized and attained by means of the steps, methods and compositions pointed out in the appended claims.

The invention consists in the novel steps, methods and compositions herein shown and described.

Among the objects of this invention is to provide aspirin preparations and techniques which:

(a) Release a portion of aspirin rapidly when ingested for prompt analgesic effect and which sustain release of the remaining aspirin over an extended period of time to provide an analgesic effect of prolonged duration.

(b) Permit safely taking a single convenient sized dose of aspirin at less frequent intervals to provide analgesic relief equivalent to taking USP aspirin tablets at one half the dosage twice as frequently.

(c) Maintain effective analgesic and anti-inflammatory relief from a bedtime dose throughout the night, continuing until arising.

(d) Permit safely taking double the conventional dose of aspirin used in products for self-medication without the usual aspirin side effects to obtain prolonged analgesic effectiveness. Such a double dose (20 grains) of aspirin taken as ordinary aspirin tablets produces uncomfortable side effects of dizziness and tinnitus in most individuals and does not appreciably prolong the duration of analgesic effectiveness obtained with a single dose of aspirin (10 grains).

(e) Provide constant analgesic effectiveness over a prolonged period of time which does not decrease between doses to the degree observed with more frequent doses of ordinary aspirin.

(f) Prevent contact of solid aspirin particles with the sensitive gastric mucosa.

It has been found that the objects of this invention may be realized by providing an analgesic preparation comprising: ethyl cellulose encapsulated particles of acetylsalicylic acid wherein (a) the amount of ethyl cellulose to acetylsalicylic acid can vary from 1–22 to 1–50 parts by weight, (b) the acetylsalicylic acid particles are distributively arranged so that substantially all are caught on a 100 mesh screen having 0.149 mm. openings, a major portion are caught on a 60 mesh screen having 0.250 mm. openings and substantially all will pass a 20 mesh screen of 0.841 mm. openings, the preponderance of acetylsalicylic acid particles in greatest dimension being not more than twice their second dimension and not more than four times their smallest dimension. See U.S.P. XVI, 1960, pages 931 and 932 relating to "Powder Fineness." in particular, the tables on page 932, namely, "Nominal Dimension of Standard Sieves" and "Classification of Powdered Sieves."

Preparations of the above type are characterized by the fact that substantially all of the encapsulated acetylsalicylic acid will be gradually released into the blood by a diffusion mechanism, over a period of four hours upon oral administration which surprisingly affords 8 hours of analgesic relief. Based upon the unusual favorable clinical results obtained by the use of the analgesic preparations of this invention, it appears that the acetylsalicylic acid is released into the blood at such a rate that optimum blood levels of acetylsalicylic acid are maintained for about four hours.

In order to appreciate fully the attributes of this invention, it is thought advisable to discuss to some extent the mechanisms involved when the above mentioned encapsulated aspirin preparations (in tablet form) are taken into the body.

When ingested, such tablets disintigrate rapidly, and the individual granules of encapsulated aspirin are dispersed in the stomach. The gastric fluids slowly diffuse in through the thin micro-capsule walls, dissolve the aspirin, and slowly diffuse out again. The rate of this process is determined by the nature of the wall material, by the thickness of the wall (so long as it is a continuous film) and by the nature of the environment. The environment is a changing one, since it is influenced by the amount and nature of fluids and foods ingested. After some time which varies from individual to individual and from one occasion to another occasion, the contents of the stomach pass into the duodenum, then to the small intestine, then to the large intestine, then to the bowels. This provides a changing environment thereby influencing the rate at which active drug is extracted from the micro-capsules of aspirin and made available for absorption through the walls of the stomach and intestines into the bloodstream.

The picture is further complicated by the fact that under conditions found in the stomach, in the intestines, and in the bloodstream, acetylsalicylic acid (ASA) is hydrolyzed to yield salicylic acid (SA). Both ASA and SA are recognized as effective analgesics; most medical experts agree that ASA is a more potent analgesic.

Sustained release medications can be characterized by widely used in vitro techniques of measuring the rate of extraction of active drug under standard laboratory conditions. Using such techniques as a guide, relatively thick-walled micro-capsules were first tried in vitro, releasing approximately half of their acetylsalicylic acid content in the first hour, and then slowly and constantly releasing the remainder of the drug over the next 6 to 8 hours. Using this preparation in vivo, very little acetylsalicylic acid can be found in the blood beyond 2 hours. Reducing the wall thickness produced a higher ASA level for 2 hours, and produced a higher salicylate level over 8 hours, but did not improve the ASA blood level appreciably beyond the 2 hour period. It appeared that some unknown factor was interfering with the transfer of ASA, but not SA, from the micro-capsules into the bloodstream. It was not until a drastic reduction of wall thickness was tried in the face of contrary prior evidence, that a rate of transfer of ASA from the tablets to the bloodstream was achieved that provided optimum blood levels of acetylsalicylic acid for a prolonged period of time. By achieving optimum blood levels for about four hours, it was discovered that effective sustained analgesic relief and anti-inflammatory relief could be achieved for an 8 to 12 hour period. While the exact biological or physiological mechanisms involved when aspirin exerts its analgesic and anti-inflammatory actions are not known, apparently such activities are not only exerted when aspirin is in the bloodstream but also when it is removed from the bloodstream and carried to other portions of the body.

A clinical study of analgesic relief proved the advantages of the pharmaceutical preparations of this invention over two different dosage regimens of regular aspirin, at the same total daily dose. This out-patient study was a three-way, double-blind cross-over on 26 cases with rheumatoid arthritis and fibrositis, in which 20 grains of the composition of Example 1 (described hereinafter in detail) and referred to herein as "Sustained Release Aspirin (SRA 20)" every 8 hours (with intervening placebos) was compared with 20 grains of regular aspirin (A–20) every 8 hours (with intervening placebos), and 12 grains of regular aspirin (A–12) every 4 hours for five doses.

The study was conducted in a major rheumatology clinic by a highly qualified clinical investigator.

Figure 2:
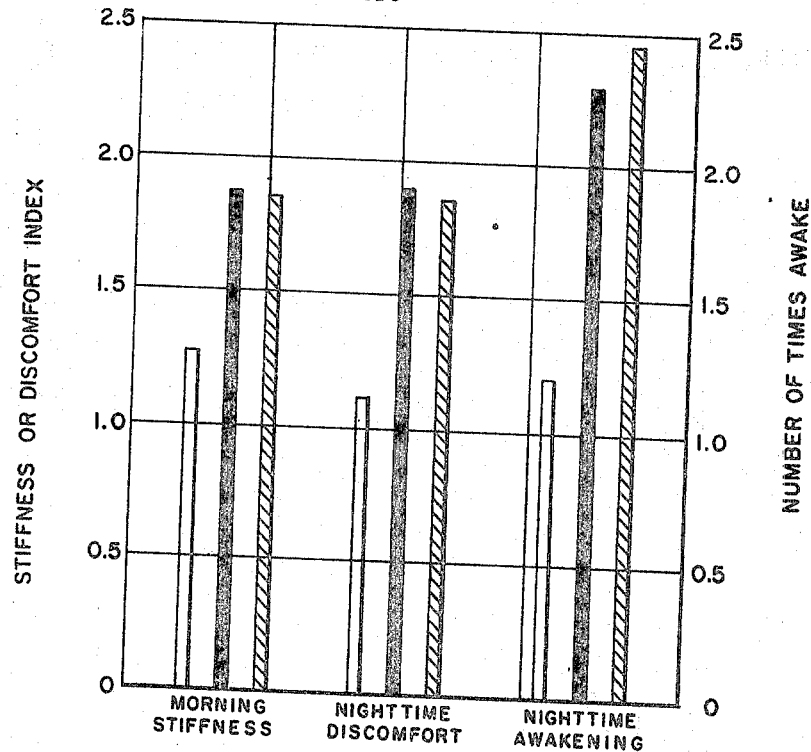

The principal results are shown in Tables I and II, and FIGURES 1 and 2 of the accompanying drawings. It will be noted that in the graphs of FIGURES 1 and 2, at the bottom of each graph is a statistical analysis of the results, for each interval of time (in FIGURE 1) and for each characteristic observed (in FIGURE 2). Each entry in the tabulated analysis is a statement of the statistical significance of differences between pairs of results. Where a percentage is stated, this is the likelihood that the result could have occurred by chance. Thus, "<0.1%" means that there is statistical assurance of greater than 99.9% that the difference observed is real and meaningful. In clinical studies with drugs, a statistical assurance of 95% or more is usually accepted by experts as significant. (Thus, in the tabulations of FIGURES 1 and 2, all figures of 5% or less mean the differences are significant.) "NSS" means No Statistical Significance. Thus, all pairs of results marked "NSS" can be considered as identical from a statistical point of view.

TABLE I.—OVERALL DRUG PREFERENCE

|  | SRA-20 (20 gr. q. 8 h.) | | A-20 (20 gr. q. 8 h.) | | A-12 (12 gr. q. 4 h.) | |
| --- | --- | --- | --- | --- | --- | --- |
|  | No. | Percent | No. | Percent | No. | Percent |
| Patient choice: | | | | | | |
| First | 19 | 73.1 | 0 | 0 | 1 | 3.8 |
| Second | 1 | 3.8 | 6 | 23.1 | 6 | 23.1 |
| Third | 0 | 0 | 7 | 26.9 | 6 | 23.1 |
| Second/third | 0 | 0 | 7 | 26.9 | 7 | 26.9 |
| No difference | 6 | 23.1 | 6 | 23.1 | 6 | 23.1 |
| Physician evaluation: | | | | | | |
| First | 23 | 88.5 | 0 | 0 | 2 | 7.7 |
| Second | 0 | 0 | 6 | 23.1 | 12 | 46.2 |
| Third | 0 | 0 | 12 | 46.2 | 6 | 23.1 |
| Second/third | 2 | 7.7 | 7 | 26.9 | 5 | 19.2 |
| No difference | 1 | 3.8 | 1 | 3.8 | 1 | 3.8 |

TABLE II.—SYMPTOM INDICES [1] BY TIME OF DAY

|  | SRA-20 (20 gr. q. 8 h.) | A-20 (20 gr. q. 8 h.) | A-12 (12 gr. q. 4 h.) |
| --- | --- | --- | --- |
| Previous night: | | | |
| Discomfort | 1.21 | 1.89 | 1.85 |
| No. of times awake | 1.20 | 2.29 | 2.45 |
| On arising: | | | |
| Pain | 1.22 | 2.05 | 1.98 |
| Stiffness | 1.27 | 1.87 | 1.86 |
| Pain: | | | |
| Morning | 0.40 | 0.69 | 0.70 |
| Afternoon | 0.30 | 0.56 | 0.26 |
| Evening | 0.41 | 1.00 | 0.42 |

[1] Based on scale:
Severe, 3.
Moderate, 2.
Slight, 1.
None, 0.

The study clearly indicates the superiority of an aspirin preparation of this invention (SRA–20) to either dosage schedule of regular aspirin (A–20 and A–12). Despite the complete blinding of the medications by the method of coding employed, 19 of the 26 patients preferred SRA–20 to either of the other medications, A–20 and A–12, and only one preferred the regular aspirin q. 4 h. A–12, with the other six finding no difference. Objectively, the physician considered SRA–20 superior to the A–20 and A–12 in 23 of the 26 patients, largely because of its greater effectiveness during the night and on arising. This was manifested by a superior score for SRA–20 over A–20 and A–12 (which were indistinguishable from each other) in night-time discomfort, number of times awake at night, pain on arising, and morning stiffness. The morning pain score for SRA–20 continued to be better than that for A–20 and A–12, although the difference no longer reached statistical significance. During the afternoon and evening, SRA–20 was indistinguishable from the 12 grains of aspirin, A–12, taken every four hours, but both of these were superior to the 20 grains of aspirin every 8 hours, A–20, with the difference reaching high statistical significance in the evening. No appreciable number of side effects of any sort were reported, but this was not surprising, because these were patients who had been on regular aspirin for their arthritis for some time.

In passing, it may be mentioned that in arriving at the instant invention, the criterion used in evaluating effective analgesia is the acetylsalicylic acid level in the blood. This approach is quite different from the criteria normally used in predicting analgesia for aspirin. More particularly, heretofore, it has been the usual practice of investigators in the aspirin timed release field who were trying to achieve effective analgesia over a long period of time to assume that analgesia was related to the salicylate level in the blood, the latter level encompassing salicylic acid and acetylsalicylic acid (aspirin).

It is our view that the above referred to criteria heretofore conventionally used for evaluating analgesic level based on salicylic acid level or salicylate level are not an accurate guide for determining analgesic level. Instead a much more realistic guide for evaluating analgesia is the acetylsalicylic acid level in the blood.

As indicated hereinbefore, under the conditions found in the stomach, in the intestines, and in the bloodstream, acetylsalicylic acid (ASA) is hydrolyzed within a short period of time to yield salicylic acid (SA). The aforementioned attributes of ASA over SA as an analgesic serve to support our view that determination of ASA level is a more significant guide for evaluating analgesic activity of an aspirin dosage form than either the salicylic acid blood level or total salicylate blood level.

Preferably, the encapsulated aspirin formulations used in accordance with the instant invention are employed in the form of tablets. Typical tablets of sustained release aspirin are made from:

|   | Percent by wt. |
|---|---|
| Encapsulated aspirin | 95 |
| Tabletting excipients | 5 |

Microcrystalline cellulose ("Avicel," made by American Viscose Corp.); guar gum, talc, U.S.P., cornstarch, U.S.P., employed in such combination, and tabletted under such conditions that the thin walls of the encapsulated aspirin granules are not cracked or smashed. The composition must provide a tablet that will withstand storage and shipping without chipping or breaking, but will disintegrate quickly and easily when wetted by saliva or gastric fluid, to give discrete particles of encapsulated aspirin.

Tablets of sustained release aspirin can be made to contain any convenient dose of aspirin. Typical adult tablets contain 5, 7.5 or 10 grains of aspirin, the latter being about the largest that can be easily swallowed by most people. Children's tablets can typically contain 2.5 grains of aspirin.

Tablets of sustained release aspirin can contain up to 96% of active ingredients, aspirin (acetylsalicylic acid). There is no critical lower limit. However, from the practical point, tablets containing less than about 75% aspirin are too bulky for easy swallowing of a typical dose of aspirin or require an excessive number of tablets per typical dose.

The granules of encapsulated aspirin could alternatively be put in conventional pharmaceutical gelatin capsules (without tabletting excipients) to give sustained release aspirin capsules. The two practical disadvantages of this form of the product are that the capsules would be much bulkier than tablets (which are highly compressed) and that the active medication would be considerably delayed (by at least half an hour) in being released.

As indicated hereinbefore, the encapsulated aspirin used in accordance with this invention consists of individual granules, or aggregates of particles of aspirin which have been coated with a thin wall of ethyl cellulose built to the desired thickness by programmed control of cooling rate and agitation rate and employing in the production of the encapsulated aspirin a weight ratio of aspirin core material to ethyl cellulose shell material in the range of 22:1 to 50:1. Also, as indicated heretofore, the aspirin particles are distributively arranged so that substantially all are caught on a screen having 0.149 mm. openings, the word "substantially" is used to include the existence of fines that may be present. A major portion are caught on a screen having 0.250 mm. openings, and substantially all will pass a screen of 0.841 mm. openings. The word "substantially" is used in the aforementioned statement to include the existence of agglomerates that may be present.

In forming tablets, conventional pharmaceutical tabletting equipment may be employed, if precautions are taken to avoid breaking open the encapsulated particles. One of the most important precautions is to select the optimum particle shape of encapsulated aspirin. Since the encapsulation process does not alter particle shape, this means that selection of the particle shape of the starting aspirin is necessary. Many commercially available forms of aspirin are crystalline rods having a ratio of length to thickness as high as 5:1. Such elongated rods are easily broken when subjected to tabletting pressures. Particles that will effectively resist breaking when subjected to tabletting pressures are those wherein their greatest dimension is not more than twice their second dimension, and not more than four times their smallest dimension. We find it preferable to utilize particles of aspirin that have been formed from compacted crystals of aspirin, since such particles have less tendency to change their release rate after being subjected to the pressure of the tabletting operation.

The following are specific examples of aspirin sustained relief preparations formed in accordance with this invention. Examples A, B, C and D relate to the preparation of encapsulated aspirin of calculated aspirin content ranging from 95.5–97.5%, while Examples 1 and 2 relate to the manufacture of tablets from the encapsulated aspirin preparations of Examples C and D respectively.

EXAMPLE A

This example utilizes the procedures and techniques disclosed in U.S. Patent 3,155,590 wherein cyclohexane is the solvent vehicle, aspirin is the core material, ethyl cellulose is the wall material, and butyl rubber is employed to maintain the wall material solution as a separate phase. The aspirin particles are distributively arranged so that substantially all are caught on a screen having 0.149 mm. openings, a major portion are caught on a screen having 0.250 mm. openings and substantially all will pass a screen of 0.841 mm. openings. The granular aspirin particles are in the form of chunky particles wherein the preponderance of the particles in greatest dimension are not more than twice their second dimension, and not more than four times their smallest dimension. The ethyl cellulose has an ethoxyl content of substantially 49.1% by weight, and a viscosity of 103 to 108 centipoises as a 5% by weight solution in a 20% alcohol/toluene solvent. The butyl rubber has a viscosity of 60–75 "Mooney" 8-minute reading at 212° F. The intended ratio of core material to capsule wall is 22:1.

Into a suitable vessel, there are introduced with agitation:

505 pounds of a 3% by weight solution of the specified butyl rubber in cyclohexane,
1135 milliliters of acetic anhydride,
4 pounds of the specified ethyl cellulose, and
88 pounds of the acetylsalicylic acid, to form a system which is heated to 80° C. and agitated sufficiently to produce minute liquid entities of ethyl cellulose-cyclohexane solution dispersed among particles of aspirin. The system is cooled with continued agitation and the liquid entities of wall-forming material deposit on the aspirin particles. The cooling is carried on to room temperature, the capsules then being recovered by decantation, filtering, centrifuging or the like. For purification, the capsules are washed with cyclohexane and refiltered to remove any entrained butyl rubber, and thereafter they are dried.

The capsules produced in this example are substantially 95.4% aspirin and release substantially 40% of their aspirin content when agitated in simulated gastric fluid at 37 degrees centigrade for 1 hour, and may be used for preparing dosage forms.

EXAMPLE B

This example makes use of a system similar to that disclosed in Example A except that low molecular weight polyethylene resin having a viscosity in the range of 7,500 to 10,000 centipoises at 150 degrees centigrade, such as Epolene C-10 now supplied by Tennessee Eastman Chemical Company, is used to maintain the wall material solution as a separate phase. The intended ratio of core material to capsule wall material is 28:1.

Into a suitable vessel, there are introduced with agitation:

500 pounds of a 2% by weight solution of the specified low molecular weight polyethylene resin in cyclohexane,
1135 milliliters of acetic anhydride,
4 pounds of the specified ethyl cellulose, and
112 pounds of the specified particulate size acetylsalicylic acid, to form a system which is heated to 80° centigrade and agitated sufficiently to produce minute liquid entities of ethyl cellulose-cyclohexane solution dispersed among particles of aspirin. Cooling and agitation are carried on, the individually coated aspirin particles are recovered and washed for purification and thereafter dried as disclosed in Example A.

The capsules produced in this example are substantially 96.0% aspirin, and release substantially 53% of their aspirin content when agitated in simulated gastric fluid at 37° C. for 1 hour, and may be used for preparing dosage forms.

EXAMPLE C

This example makes use of a system similar to that disclosed in Example B except that the intended ratio of core material to capsule wall material is 35:1.

Into a suitable vessel, there are introduced with agitation:

500 pounds of a 2% by weight solution of the specified low molecular weight polyethylene resin in cyclohexane,
1135 milliliters of acetic anhydride,
3 pounds of the specified ethyl cellulose, and
105 pounds of the specified particulate size acetylsalicylic acid, to form a system which is heated to 80° C. and agitated sufficiently to produce minute liquid entities of ethyl cellulose-cyclohexane solution dispersed among particles of aspirin. Cooling and agitation are carried on, the individually coated aspirin particles are recovered and washed for purification, and thereafter they are dried as disclosed in Example A.

The capsules produced in this example are substantially 96.4% aspirin, and release substantially 61% of their aspirin content when agitated in simulated gastric fluid at 37° C. for 1 hour, and may be used for preparing dosage forms.

EXAMPLE D

This example makes use of a system similar to that disclosed in Example B except that the intended ratio of core material to capsule wall material is 50:1.

Into a suitable vessel, there are introduced with agitation:

1000 pounds of a 2% by weight solution of the specified low molecular weight polyethylene resin in cyclohexane,
2270 milliliters of acetic anhydride,
4.2 pounds of the specified ethyl cellulose, and
210 pounds of the specified particulate size acetylsalicylic acid, to form a system which is heated to 80° C. and agitated sufficiently to produce minute liquid entities of ethyl cellulose-cyclohexane solution dispersed among particles of aspirin. Cooling and agitation are carried on, the individually coated aspirin particles are recovered and washed for purification, and thereafter they are dried as disclosed in Example A.

The capsules produced in this example are substantially 97.8% aspirin, and release substantially 68% of their aspirin content when agitated in simulated gastric fluid at 37° C. for 1 hour, and may be used for preparing dosage forms.

EXAMPLE I

The following composition was mixed, using conventional pharmaceutical processing equipment:

|  | Weight | | |
|---|---|---|---|
|  | Batch (kg.) | Per tablet (mg.) | Percent |
| Encapsulated aspirin of Ex. C (96.4% acetylsalicylic acid) | 25.896 | 664 | 93.13 |
| Avicel (microcrystalline cellulose) | 1.365 | 35 | 4.91 |
| Cornstarch | 0.390 | 10 | 1.40 |
| Guar Gum | 0.156 | 4 | 0.56 |
| Total | 27.807 | 713 | 100.00 |

This mixture was tabletted on a conventional pharmaceutical rotary tabletting machine, using capsule-shaped punches (Length 0.627", Width 0.286") yielding tablets having a thickness of substantially 0.259", a weight of substantially 713 mg., a hardness of substantially 12.5 kg. by a Stokes tablet hardness tester, and a disintegration time of less than 45 seconds in distilled water at 37° C. The tablets assayed 10.0 grains ASA/tablet, contained 0.05% SA, and released substantially 68% of their aspirin when agitated in simulated gastric fluid at 37° C. for 1 hour.

The above described composition (SRA-20) is the analgesic preparation used in the clinical investigation referred to hereinbefore in discussing Tables I and II and FIGURES 1 and 2 of the drawings.

EXAMPLE II

The following composition was mixed, using conventional pharmaceutical tabletting equipment:

|  | Weight | | |
|---|---|---|---|
|  | Batch (kg.) | Per tablet (mg.) | Percent |
| Encapsulated Aspirin of Ex. D (97.8% acetylsalicylic acid) | 10.560 | 660 | 93.09 |
| Avicel | 0.560 | 35 | 4.94 |
| Cornstarch | 0.160 | 10 | 1.41 |
| Guar Gum | 0.064 | 4 | 0.56 |
| Total | 11.344 | 709 | 100.00 |

This mixture was tabletted on a conventional pharmaceutical rotary tabletting machine using capsule-shaped punches (Length 0.627", Width 0.286") yielding tablets having a hardness of substantially 10.5 kg. by a Stokes tablet hardness tester and a disintegration time of less than 45 seconds in distilled water at 37° C. The tablets assayed 10.0 grains ASA/tablet contained 0.06% SA, and released substantially 71% of their aspirin when agitated in simulated gastric fluid at 37° C. for 1 hour.

If so desired, the therapeutic compositions of this invention include combining the encapsulated aspirin preparations of the invention with other active components. For example, encapsulated aspirin could be combined with regular aspirin if it were desired to provide a greater initially available dose but still release the major portion of the aspirin slowly. If a material portion of the aspirin were to be added in a non-sustained form, then the release rate of the encapsulated portion of the tablet would have to be readjusted in order to provide the optimum desired release for the tablet.

Typical of other drugs that might be combined with encapsulated aspirin to provide combination drugs are: Phenacetin, Sodium salicylate, Caffeine, Salicylamide, Acetaminophen, Scopolamine, Phenylephrine hydrochloride, Glyceryl guaiacolate, Chlorpheniramine maleate, Belladona alkaloids, Dextromethorphan hydrobromide, Ephedrine hydrochloride, Phenylpropanolamine hydroride.

The invention in its broader aspects is not limited to the specific steps, methods and compositions described but departures may be made therefrom within the scope of the accompanying claims without departing from the principles of the invention and without sacrificing its chief advantages.

What is claimed is:

1. An orally ingestible compressed tablet analgesic dosage composition, compressed with a suitable amount of a conventional pharmaceutical tabletting excipient, to a tablet hardness resulting from a pressure sufficient to break easily crystalline rods of acetylsalicyclic acid having a ratio of length to thickness as high as 5:1, said tablet hardness pressure being about 10.5 kg. but less than that hardness wherein the thin ethyl cellulose encapsulation walls are cracked or smashed, consisting essentially of: ethyl cellulose encapsulated particles of acetylsalicyclic acid wherein (a) the amount of ethyl cellulose to acetylsalicyclic acid can vary from 1–22 to 1–50 parts by weight, (b) the acetylsalicyclic acid particles are distributively arranged so that substantially all are caught on a screen having 0.149 mm. openings, a major portion are caught on a screen having 0.250 mm. openings and substantially all will pass a screen of 0.841 mm. openings the preponderance of acetylsalicyclic acid particles in greatest dimension being not more than twice their second dimension, and not more than four times their smallest dimension, such aspirin particles consisting essentially of compacted granules of crystalline aspirin.

2. The sustained analgesic relief preparation according to claim 1 wherein the acetylsalicyclic acid is in an amount from 2.5 to 10 grains.

References Cited

UNITED STATES PATENTS

| | | | |
|---|---|---|---|
| 3,115,441 | 12/1963 | Hermelin | 167—82 |
| 3,146,168 | 8/1964 | Battista | 167—82 |
| 3,155,590 | 11/1964 | Miller et al. | 167—83 |
| 3,341,416 | 9/1967 | Anderson et al. | 167—83 |

OTHER REFERENCES

Ecanow Powders, pp. 23–25 in Martin et al., Husa's Pharmaceutical Dispensing, 5th ed., 1959.

United States Pharmacopoeia, Sixteenth Revision (USP XVI), pp. 931–932, 934–935 (1960) U.S.P.C.; Inc. Washington, D.C.

Lees, Fine Particles in Pharmaceutical Practice, J. Pharm. Pharmacol. 15(T), Suppl., pp. 43–55, December 1963.

S. K. ROSE, Primary Examiner

U.S. Cl. X.R.
424—230